(12) United States Patent
Enguehard et al.

(10) Patent No.: US 11,470,176 B2
(45) Date of Patent: Oct. 11, 2022

(54) EFFICIENT AND FLEXIBLE LOAD-BALANCING FOR CLUSTERS OF CACHES UNDER LATENCY CONSTRAINT

(71) Applicant: Cisco Technology, Inc., San Jose, CA (US)

(72) Inventors: Marcel Paul Sosthène Enguehard, Paris (FR); Yoann Desmouceaux, Paris (FR); Pierre Pfister, Angers (FR); William Mark Townsley, Paris (FR); Eric Vyncke, Alleur (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 372 days.

(21) Appl. No.: 16/261,462

(22) Filed: Jan. 29, 2019

(65) Prior Publication Data
US 2020/0244758 A1 Jul. 30, 2020

(51) Int. Cl.
*H04L 67/568* (2022.01)
*G06F 16/957* (2019.01)
(Continued)

(52) U.S. Cl.
CPC ........ *H04L 67/568* (2022.05); *G06F 16/9574* (2019.01); *H04L 67/104* (2013.01);
(Continued)

(58) Field of Classification Search
CPC ... H04L 67/1002–1038; H04L 67/2814; H04L 67/2842–2852; H04L 67/32–327;
(Continued)

(56) References Cited

U.S. PATENT DOCUMENTS 5,983,281 A * 11/1999 Ogle ................... H04L 67/1036
370/401
6,351,775 B1 * 2/2002 Yu ....................... H04L 67/1014
709/238

(Continued)

FOREIGN PATENT DOCUMENTS

EP 2624524 A1 8/2013
WO WO 2009/068952 A2 6/2009

OTHER PUBLICATIONS

J. Hachem, N. Karamchandani and S. N. Diggavi, "Coded Caching for Multi-level Popularity and Access," in IEEE Transactions on Information Theory, vol. 63, No. 5, pp. 3108-3141, May 2017, doi: 10.1109/TIT.2017.2664817. (Year: 2017).*

(Continued)

Primary Examiner — Glenton B Burgess
Assistant Examiner — Julian Chang
(74) Attorney, Agent, or Firm — Polsinelli

(57) ABSTRACT

The present technology provides a system, method and computer readable medium for steering a content request among plurality of cache servers based on multi-level assessment of content popularity. In some embodiments a three levels of popularity may be determined comprising popular, semi-popular and unpopular designations for the queried content. The processing of the query and delivery of the requested content depends on the aforementioned popularity level designation and comprises a acceptance of the query at the edge cache server to which the query was originally directed, rejection of the query and re-direction to a second edge cache server or redirection of the query to origin server to thereby deliver the requested content. The proposed technology results in higher hit ratio for edge cache clusters by steering requests for semi-popular content (Continued)

to one or more additional cache servers while forwarding request for unpopular content to origin server.

20 Claims, 8 Drawing Sheets

(51) Int. Cl.
| | |
|---|---|
| *H04L 67/63* | (2022.01) |
| *H04L 67/1097* | (2022.01) |
| *H04L 67/104* | (2022.01) |
| *H04N 21/433* | (2011.01) |
| *H04N 21/472* | (2011.01) |
| *H04N 21/231* | (2011.01) |

(52) U.S. Cl.
CPC ......... *H04L 67/63* (2022.05); *H04N 21/4331* (2013.01); *H04L 67/1097* (2013.01); *H04N 21/231* (2013.01); *H04N 21/47202* (2013.01)

(58) Field of Classification Search
CPC ... H04L 67/1001–1038; H04L 67/2885; H04L 67/568–5683; H04N 21/4331; H04N 21/432–4325; H04N 21/433–4335; G06F 16/957–9577
See application file for complete search history.

(56) References Cited

U.S. PATENT DOCUMENTS

| | | | | |
|---|---|---|---|---|
| 7,454,571 | B1* | 11/2008 | Sucharitakul | G06F 16/24552 711/129 |
| 7,761,594 | B1* | 7/2010 | Mowat | H04L 67/2814 709/238 |
| 8,095,764 | B1* | 1/2012 | Bauer | G06F 3/0605 711/170 |
| 8,151,077 | B1* | 4/2012 | Bauer | G06F 12/0802 711/170 |
| 8,250,198 | B2* | 8/2012 | Zhang | G06Q 10/06 709/223 |
| 8,612,028 | B2* | 12/2013 | Karlsson | G05B 13/042 700/31 |
| 8,856,281 | B2* | 10/2014 | Van der Merwe | H04L 67/2842 709/219 |
| 9,129,033 | B1* | 9/2015 | Jenkins | G06F 16/907 |
| 9,167,049 | B2* | 10/2015 | Fliam | G06F 3/0685 |
| 9,268,651 | B1* | 2/2016 | Salyers | G06F 11/1464 |
| 9,268,652 | B1* | 2/2016 | Salyers | G06F 12/0804 |
| 9,274,956 | B1* | 3/2016 | Salyers | G06F 12/0868 |
| 9,350,822 | B2* | 5/2016 | Li | H04L 67/2852 |
| 9,432,794 | B2* | 8/2016 | Agrawal | H04W 4/50 |
| 9,553,924 | B1* | 1/2017 | Duzett | H04N 21/23116 |
| 9,559,889 | B1* | 1/2017 | Vincent | H04L 67/2842 |
| 9,794,148 | B1* | 10/2017 | Ramachandran | H04L 45/22 |
| 9,979,617 | B1* | 5/2018 | Meyer | H04L 43/0817 |
| 10,225,365 | B1* | 3/2019 | Hotchkies | H04L 67/2842 |
| 10,261,938 | B1* | 4/2019 | Jenkins | G06F 16/9574 |
| 10,311,372 | B1* | 6/2019 | Hotchkies | H04L 67/32 |
| 10,320,934 | B1* | 6/2019 | Ghosh | H04L 67/02 |
| 10,516,568 | B2* | 12/2019 | Jain | H04L 67/327 |
| 2002/0143798 | A1* | 10/2002 | Lisiecki | H04L 67/1008 |
| 2002/0198953 | A1* | 12/2002 | O'Rourke | H04L 67/2852 709/213 |
| 2003/0101231 | A1* | 5/2003 | Kausik | H04L 67/2814 709/217 |
| 2003/0101265 | A1* | 5/2003 | Dantzig | H04L 67/1008 709/226 |
| 2003/0110272 | A1* | 6/2003 | du Castel | H04L 67/2819 709/229 |
| 2004/0098541 | A1* | 5/2004 | Megiddo | G06F 12/122 711/129 |
| 2004/0230753 | A1* | 11/2004 | Amiri | G06F 9/5016 711/147 |
| 2005/0066326 | A1* | 3/2005 | Herbeck | G06F 11/3409 718/100 |
| 2005/0120000 | A1* | 6/2005 | Ziauddin | G06F 16/24549 |
| 2005/0182754 | A1* | 8/2005 | Madan | G06F 16/9535 |
| 2006/0090033 | A1* | 4/2006 | Betancourt | H04L 67/2842 711/118 |
| 2006/0271972 | A1* | 11/2006 | Pai | H04N 21/2225 725/86 |
| 2006/0288119 | A1* | 12/2006 | Kim | H04L 67/2842 709/238 |
| 2008/0147878 | A1* | 6/2008 | Kottomtharayil | H04L 67/1029 709/235 |
| 2008/0195755 | A1* | 8/2008 | Lu | H04L 45/00 709/241 |
| 2008/0205268 | A1* | 8/2008 | Imai | H04L 47/10 370/230 |
| 2008/0208961 | A1* | 8/2008 | Kim | H04L 67/1021 709/203 |
| 2009/0254661 | A1* | 10/2009 | Fullagar | H04N 21/25891 709/226 |
| 2010/0325303 | A1* | 12/2010 | Wang | H04L 67/2804 709/231 |
| 2010/0332595 | A1* | 12/2010 | Fullagar | H04N 21/23103 709/203 |
| 2011/0078312 | A1* | 3/2011 | Rimae | H04L 67/1046 709/227 |
| 2011/0113200 | A1* | 5/2011 | Moses | G06F 12/0888 711/130 |
| 2011/0264865 | A1* | 10/2011 | Mobarak | G06F 12/121 711/141 |
| 2011/0280143 | A1* | 11/2011 | Li | H04L 67/143 370/252 |
| 2012/0041970 | A1* | 2/2012 | Ghosh | H04L 67/289 707/769 |
| 2012/0047344 | A1* | 2/2012 | Sheaffer | G06F 9/3013 711/165 |
| 2012/0110015 | A1* | 5/2012 | Nath | G06F 16/3349 707/780 |
| 2012/0124294 | A1* | 5/2012 | Atkisson | H04L 12/403 711/135 |
| 2012/0151141 | A1* | 6/2012 | Bell, Jr. | G06F 11/3485 711/118 |
| 2012/0203866 | A1 | 8/2012 | Yoo et al. | |
| 2012/0259861 | A1* | 10/2012 | Gong | G06F 16/1827 707/741 |
| 2012/0317307 | A1* | 12/2012 | Ravindran | H04N 21/64746 709/238 |
| 2013/0080611 | A1* | 3/2013 | Li | H04N 21/222 709/223 |
| 2013/0185038 | A1* | 7/2013 | Radu | G06F 11/3419 703/2 |
| 2013/0204961 | A1* | 8/2013 | Fliam | H04L 67/2885 709/214 |
| 2013/0227048 | A1* | 8/2013 | Xie | H04L 67/06 709/213 |
| 2013/0227051 | A1* | 8/2013 | Khakpour | H04L 29/08729 709/213 |
| 2013/0227166 | A1* | 8/2013 | Ravindran | H04L 67/2833 709/238 |
| 2013/0263194 | A1* | 10/2013 | Zhang | H04N 21/23106 725/92 |
| 2013/0290465 | A1* | 10/2013 | Harrison | H04L 67/2842 709/213 |
| 2014/0025841 | A1* | 1/2014 | Li | G06F 16/9574 709/232 |
| 2014/0044127 | A1* | 2/2014 | Li | H04L 67/2852 370/389 |
| 2014/0068196 | A1* | 3/2014 | Benoit | G06F 12/0871 711/135 |
| 2014/0237071 | A1* | 8/2014 | Friman | H04L 67/2847 709/216 |
| 2014/0344379 | A1* | 11/2014 | Chakraborti | H04L 65/403 709/206 |
| 2014/0359043 | A1* | 12/2014 | Gao | G06F 15/17331 709/212 |

(56) References Cited

U.S. PATENT DOCUMENTS

| | | | | |
|---|---|---|---|---|
| 2015/0092551 | A1* | 4/2015 | Moisand | H04L 67/146 370/235 |
| 2015/0113166 | A1* | 4/2015 | Mosko | H04L 45/04 709/242 |
| 2015/0113575 | A1* | 4/2015 | Li | H04N 21/235 725/92 |
| 2015/0180719 | A1* | 6/2015 | Wu | H04L 47/726 709/224 |
| 2015/0254249 | A1* | 9/2015 | Mosko | G06F 16/24578 707/751 |
| 2015/0263916 | A1* | 9/2015 | Phillips | H04L 65/80 709/224 |
| 2015/0341467 | A1* | 11/2015 | Lim | H04L 67/02 709/203 |
| 2016/0021162 | A1* | 1/2016 | Surcouf | H04N 21/238 709/219 |
| 2016/0034394 | A1* | 2/2016 | McKean | G06F 12/0891 709/217 |
| 2016/0088072 | A1* | 3/2016 | Likhtarov | H04L 67/1008 709/226 |
| 2016/0088115 | A1* | 3/2016 | Agnew | H04L 51/26 709/206 |
| 2016/0094471 | A1* | 3/2016 | Newton | H04L 67/2842 709/226 |
| 2016/0248678 | A1* | 8/2016 | Zhao | H04L 47/283 |
| 2016/0373464 | A1* | 12/2016 | Kikuchi | H04L 63/0263 |
| 2017/0026224 | A1* | 1/2017 | Townsley | H04L 69/22 |
| 2017/0026286 | A1* | 1/2017 | Surcouf | H04L 67/1097 |
| 2017/0026449 | A1* | 1/2017 | Cuduvalli Ravikanth Rao | H04L 67/42 |
| 2017/0064717 | A1* | 3/2017 | Filsfils | H04L 47/17 |
| 2017/0078433 | A1* | 3/2017 | Radhakrishnan | H04L 67/1097 |
| 2017/0111468 | A1* | 4/2017 | Ash | G06F 3/0635 |
| 2017/0126903 | A1* | 5/2017 | Cohen | H04L 67/28 |
| 2017/0171114 | A1* | 6/2017 | Dao | H04L 67/2842 |
| 2017/0195447 | A1* | 7/2017 | Panagos | H04L 67/2814 |
| 2017/0257452 | A1* | 9/2017 | Hoiles | H04L 67/2842 |
| 2017/0264702 | A1* | 9/2017 | Dao | H04L 67/1097 |
| 2017/0295132 | A1* | 10/2017 | Li | H04L 63/045 |
| 2017/0302575 | A1* | 10/2017 | Ward | H04L 61/6063 |
| 2017/0310744 | A1* | 10/2017 | Maslak | H04L 67/327 |
| 2017/0329720 | A1* | 11/2017 | Bedi | G06F 12/0813 |
| 2018/0034900 | A1* | 2/2018 | Kamiyama | H04L 67/1097 |
| 2018/0054482 | A1* | 2/2018 | Ruiz | H04L 67/1004 |
| 2018/0091619 | A1* | 3/2018 | Power | H04L 67/2847 |
| 2018/0131580 | A1* | 5/2018 | Tomkins | H04L 41/0823 |
| 2018/0219783 | A1* | 8/2018 | Pfister | H04L 67/1023 |
| 2018/0241671 | A1* | 8/2018 | Bosch | H04L 67/327 |
| 2018/0278680 | A1* | 9/2018 | Liu | H04L 67/2842 |
| 2018/0278688 | A1* | 9/2018 | Gal | H04L 67/32 |
| 2018/0302490 | A1* | 10/2018 | Surcouf | H04L 67/02 |
| 2019/0007522 | A1* | 1/2019 | Satzke | H04L 67/322 |
| 2019/0037042 | A1* | 1/2019 | Kwak | H04L 47/822 |
| 2019/0042867 | A1* | 2/2019 | Chen | G06K 9/46 |
| 2019/0043201 | A1* | 2/2019 | Strong | G06K 9/00624 |
| 2019/0079928 | A1* | 3/2019 | Kumar | G06F 16/14 |
| 2019/0199616 | A1* | 6/2019 | Jones | H04L 63/02 |
| 2019/0236016 | A1* | 8/2019 | Jawahar | G06F 12/0871 |
| 2019/0320034 | A1* | 10/2019 | Newton | H04N 7/17354 |
| 2019/0349268 | A1* | 11/2019 | Pai | H04L 63/0892 |
| 2020/0073905 | A1* | 3/2020 | Deng | G06F 12/0811 |
| 2020/0076892 | A1* | 3/2020 | Surcouf | H04L 67/1002 |
| 2020/0162385 | A1* | 5/2020 | Thiagaraj | H04L 43/0876 |
| 2020/0204626 | A1* | 6/2020 | Zhang | H04L 67/42 |
| 2021/0182215 | A1* | 6/2021 | Wang | G06F 12/123 |

OTHER PUBLICATIONS

V. Mathur, P. Patil, V. Apte and K. M. Moudgalya, "Adaptive admission control for web applications with variable capacity," 2009 17th International Workshop on Quality of Service, Charleston, SC, USA, 2009, pp. 1-5, doi: 10.1109/IWQoS.2009.5201411. (Year: 2009).*

Y. Desmouceaux, P. Pfister, J. Tollet, M. Townsley and T. Clausen, "6LB: Scalable and Application-Aware Load Balancing with Segment Routing," in IEEE/ACM Transactions on Networking, vol. 26, No. 2, pp. 819-834, Apr. 2018, doi: 10.1109/TNET.2018.2799242. (Year: 2018).*

Y. Desmouceaux, P. Pfister, J. Tollet, M. Townsley and T. Clausen, "SRLB: The Power of Choices in Load Balancing with Segment Routing," 2017 IEEE 37th International Conference on Distributed Computing Systems (ICDCS), Atlanta, GA, USA, 2017, pp. 2011-2016, doi: 10.1109/ICDCS.2017.180. (Year: 2017).*

A. Kamra, V. Misra and E. M. Nahum, "Yaksha: a self-tuning controller for managing the performance of 3-tiered Web sites," Twelfth IEEE International Workshop on Quality of Service, 2004. IWQOS 2004., Montreal, QC, Canada, 2004, pp. 47-56, doi: 10.1109/IWQOS.2004.1309356. (Year: 2004).*

K. M. Agrawal, T. Venkatesh and D. Medhi, "A dynamic popularity-based partial caching scheme for video on demand service in IPTV networks," 2014 Sixth International Conference on Communication Systems and Networks (COMSNETS), 2014, pp. 1-8, doi: 10.1109/COMSNETS.2014.6734888. (Year: 2014).*

Najaflou, Nima, et al. "Popularity-Based Hierarchical Caching for Next Generation Content Delivery Networks." International Conference on Industrial Networks and Intelligent Systems. Springer, Cham, 2021. (Year: 2021).*

Y. Desmouceaux, M. Enguehard, V. Nguyen, P. Pfister, W. Shao and É. Vyncke, "A Content-aware Data-plane for Efficient and Scalable Video Delivery," 2019 IFIP/IEEE Symposium on Integrated Network and Service Management (IM), 2019, pp. 10-18. (Year: 2019).*

T. Janaszka, D. Bursztynowski and M. Dzida, "On popularity-based load balancing in content networks," 2012 24th International Teletraffic Congress (ITC 24), 2012, pp. 1-8. (Year: 2012).*

International Search Report and Written Opinion from the International Searching Authority, dated May 7, 2020, 13 pages, for corresponding International Patent Application No. PCT/US2020/015452.

* cited by examiner

EFFICIENT AND FLEXIBLE LOAD-BALANCING FOR CLUSTERS OF CACHES UNDER LATENCY CONSTRAINT

TECHNICAL FIELD

The present technology pertains to systems and methods for implementing in-network caching system. More specifically it is directed to reducing latency and network load in content delivery network by increasing the hit-ratio for clusters of in-network caches.

BACKGROUND

Internet traffic related to Video-on-Demand (VoD) and linear video streaming services is projected to approximately reach 74 TB/s by the year 2021, representing 82% of the total internet traffic. As such, Content Delivery Networks (CDN) have been deployed to facilitate scaling of the network while providing better Quality of Experience to clients. However, the sheer scale of the video traffic and the ever-increasing expectations with regards to the Quality of Experience raises stringent engineering challenges for Content delivery Networks. Under such conditions, network scalability becomes a critical problem for video delivery as traditional Content Delivery Networks (CDN) struggle to cope with the demand. Amongst those challenges, a crucial one involves enhancing the efficiency with which relevant resources are utilized (network, storage, and compute). This is an essential improvement as simple scale up in processing hardware in response to an increasing network load is, in many cases, insufficient to meet the required Quality of Experience for content user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
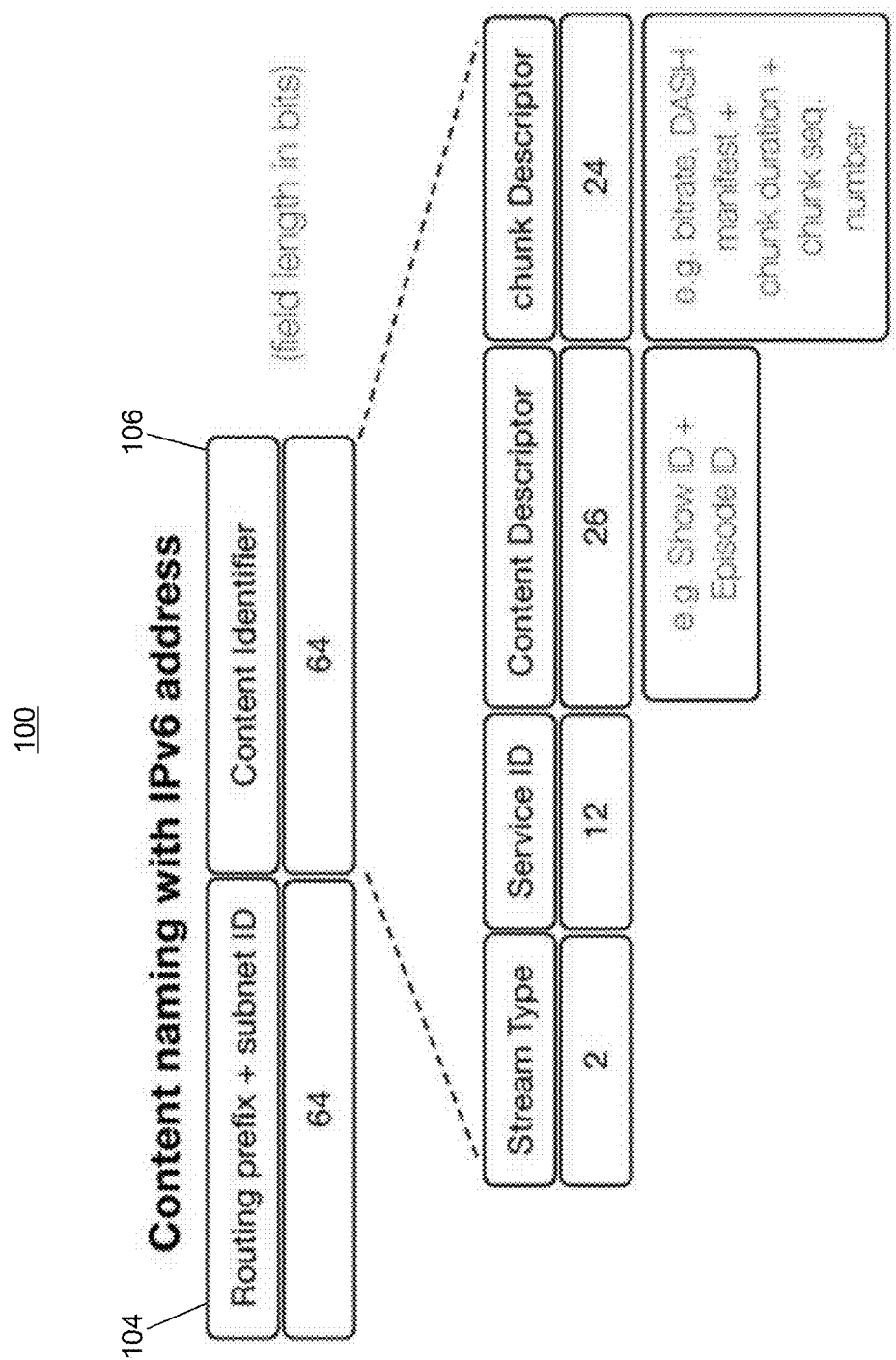
FIG. 1 illustrates a modified IPv6 address format comprising a network locator portion and a content identifier portion, in accordance to some embodiments of the present technology.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are systems, methods, and computer-readable media for optimizing a hit rate performance and service level response times for a cluster of in-network cache servers. Aspects of the disclosed technology are directed to a filtering scheme based on a multi-level popularity assessment of content request traffic. In some embodiments of the present technology, a controller-tuned threshold parameter is used for differentiating between popular and semi-popular contents.

In one aspect of the present technology, a method includes specifying, at an edge device, a threshold parameter for partitioning a meta-cache, comprising a plurality of last requested content identifiers, into a popular portion and a semi-popular portion; re-directing, using an appropriate forwarding/routing protocol, a first cache-miss request generated for a content identifier in the semi-popular portion of the meta-cache, to one or more additional cache servers; re-directing, using appropriates forwarding/routing protocol, a second cache-miss request generated by the one or more additional cache servers for the content identifiers in the semi-popular portion of the meta-cache to an origin server hosting the requested content. Some embodiments of the present technology further comprise a step of tuning a value of the threshold parameter, using a Proportional-Integrate controller, to optimize a tradeoff between cache hit rate and one or more other network performance metrics.

As such, embodiments of the present technology provide for a multi-level popularity based filtering of content requests for enhancing a hit rate of edge cache servers in content delivery networks. In some embodiments, this is accomplished by maintaining a meta-cache of content-identifiers corresponding to a number of most recently requested contents along with a threshold parameter for partitioning meta-cache entries into popular and semi-popular categories. For example, contents identified as semi-popular are associated with a different cache miss forwarding policy as opposed to contents deemed as popular and similarly for contents deemed as unpopular. To further expand upon the aforementioned feature, in an event of cache-miss request for content identified in semi-popular portion of the meta-cache, the first receiving cache server may re-direct the request to another cache server that may have been pseudo-randomly chosen rather than forwarding the request directly to the origin server.

In one aspect of the present technology, a system includes one or more content-request filtering units communicatively coupled to one or more edge cache servers, each content-request filtering unit may further comprise: a meta-cache of a plurality of most recently requested content identifiers partitioned across a threshold index, into a popular and a semi-popular portions, wherein requests for content identifiers in the semi-popular portion are forwarded to an origin content server only in an event of a cache miss from each of a plurality of cache servers across which a semi-popular content request is sequentially steered. In some embodiments of the present technology, the system may further comprise one or more PI controller operative to tune the threshold parameter of the meta-cache to thereby optimize a trade-off between cache hit rate and one or more other performance attributes.

Therefore, a content filtering/routing unit comprising a meta-cache of most recently used content identifiers may apply a different cache-miss forwarding policy to requests for contents based on a popularity level of the aforementioned content. In some embodiments, the present technology includes a threshold parameter for differentiating between popular and semi-popular contents in the meta-cache of most recently used content identifiers. The threshold parameter may be tuned using a self-tuning Proportional-Integral controller, in accordance with some embodiments. For example, request for contents identified in a semi-popular portion of the meta cache may be re-directed to one or more additional cache servers after encountering an initial cash miss from a first cache server. Accordingly, embodiments of the present technology enable a more thorough cache search to be performed for requested contents prior to re-directing the content request to an origin content server.

DETAILED DESCRIPTION

Multi-tiered video Content Delivery Network (CDN) architectures, generally consist of three main components: (i) clients who request and consume video chunks, (ii) origin servers that serve the requested content, and (iii) edge caches, located closer to the clients (i.e., in an ISP network), which store the most popular video chunks to reduce the load on the origin servers. A key property to be satisfied by a Content Delivery Networks (CDN) is to serve content with small latency while minimizing the infrastructure costs. One approach to achieve low-latency content delivery without incurring significant infrastructure cost is based on caching popular content close to the users, while keeping less popular content on the more centralized servers. As such, a network of caches, each reasonably close to the clients, and capable of serving the same content as provided by a single origin server may be used to cache as much of the content as possible at the edge, and let as much as possible of the unpopular content be served by the origin server.

The rate at which content is requested and successfully served from a selected server, such as an edge cache server, can be termed a "hit rate." The hit rate on edge caches has a strong impact on Quality of Experience (QoE) related factors, such as chunk download time. For example, it has been shown that cache misses increase server latency by up to an order of magnitude, which in turn translates into increased client start-up times. One reason for this degradation of server latency involves the incurred network cost of proxying Hypertext Transfer Protocol (HTTP or HTTPS) connections to the origin server in an event of a cache miss at a cache server. It is, therefore, important to the scalability of the CDN architecture that most requests for content are successfully served from edge caches, as this decreases the load on the origin servers.

However, as the load on edge caches increases, addressing the capacity issue by simply using more powerful servers or adding hardware resources may become prohibitively costly. Popularity based filtering at the edge may therefore become necessary in order to decide where the content should be cached, whether to re-direct the request or proxy the content, as well as where to re-direct content requests. Current architectures suffer from two main issues. Namely, upon cache miss, HTTP proxying is used in order to fetch content from the origin. This has a non-negligible performance cost compared to rerouting the requests towards the origin directly at layer 3. Furthermore, existing architectures do not utilize the horizontal scaling of the cache for collaboration between caches, instead, when there is a cache miss, the request is usually forwarded back to the origin, whereas trying another cache beforehand could be beneficial for semi-popular content.

The forgoing is addressed by embodiments of the present technology directed to system, method and computer-readable medium for video Content Delivery Networks (CDN) that utilizes chunk-level content addressing and multi-tiered content popularity assessment (in deployed networking technologies) to make intelligent decision with regards to optimal processing of content request and content delivery. The optimal processing of content-related traffic, in one regard, is directed to enhancing a hit ratio of a cache system, which in turn reduces latency and network loading associated with servicing of request for contents such as video. As such, some embodiments of the present invention are directed to increasing cache hit rate at the network edge while also reducing adverse impacts (i.e., latency and network load) associated with cache misses. To that end, embodiments of the disclosed technology utilize network-layer video chunk naming to facilitate popularity-based multi-tier classification for the requested contents.

In some embodiments, named-video chunks (content identifier embedded within network address of the request packet header) may be used in the forwarding plane within a system and/or configuration that is deployable in current IP-based networks. Accordingly, each video segment may be matched with a unique network identifier, using, for example, a 64-bit encoding to contain the video identifier, the identifier of the segment within the video, and potentially additional metadata such as the segment duration and the requested video bitrate/quality. An IPv6 address may then be constructed from this name. With reference to FIG. 1, an example of a modified IPv6 address 100 comprises a first 64 bits portion 104 that constitute a routing prefix and subnet identifier that may be specific to the video producer and acts as a network locator. Moreover, the modified example IPv6 address 100 further comprises second a 64-bits portion 106 that constitute content metadata and acts as a content identifier.

In accordance to some embodiments of the present technology, chunk-level content addressing as part of the layer 3 address portion of a content request packet header may be used to provide content-awareness and tracking at the network layer. In some embodiments of the present technology the aforementioned Network level content-awareness and tracking may be used in conjunction with a Last Recently Used (LRU) filtering policy to provide a multi-level popularity based filtering of content requests. In some embodiments, popularity-based LRU filtering may be implemented by keeping a "meta-cache" of identifiers, driven by a Least Recently Used replacement policy. Presence of a content identifier in the meta-cache may be considered as an indicator of popularity. However, instead of classifying between "popular" and "unpopular" content, embodiments of the present technology disclose a three-tiered classification approach which classifies content between "popular", "semi-popular" and "unpopular". Thus enhancing an accuracy and efficiency with which the delivery of unpopular content are offloaded to the origin server and popular content are served at the cache.

In accordance with some embodiments of the present technology, chunk-level content addressing consists of assigning a unique and globally routable IPv6 address to each video chunk. Exposing the chunk and video identifiers in the IPv6 addresses space provides network layer visibility to the requested content. Accordingly, a content routing/filtering service, disposed between client system and network caching resources may be used to examine content request packets destined for one or more edge cache servers, in order to construct a meta-cache of the Last Recently Used content identifiers from the content-identifiers exposed as IP addresses in the content request packet. The content routing/filtering service may then assign specific popularity ratings (i.e., popular or a semi-popular rating) to different client-requested content based on the indexed position of the corresponding content identifier in the meta-cache of the Last Recently Used content identifiers. In some embodiments, the indexed position, for the purpose of popularity rating, may be determined in relation to a statically or dynamically computed threshold level. Contents may be identified as popular or semi-popular depending on whether the corresponding content identifier is disposed above or below the threshold level, while content identifiers missing from the meta-cache deemed to correspond to un-popular content. The content routing/filtering service may then make in-band content request forwarding decisions based on content popularity classification of the requested content.

According to some embodiments of the present technology, content deemed as popular may be served locally at the cache server. Conversely, requests for contents deemed as unpopular may be directed to the origin server and served by the same. For semi-popular content unavailable at the initial cache server, it may be likely that another (edge) cache has a copy of the content. Therefore, in those cases, rather than directly going back to the origin, embodiments provide for a detour through another pseudo-randomly-chosen edge cache. The re-direction/detour to a second cache server and/or the origin server on cache misses may be handled, in accordance to some embodiments, with the use of HTTP proxy. However, in some embodiments of the present technology, the re-direction/detour may be performed using a Segment Routing Load Balancing (SRLB) approach (such as, for example, 6 LB load balancing protocol) to improve performance. For example, in some embodiments of the disclosed technology, IPv6 Segment Routing (SRv6) is utilized to steer client requests through a chain of candidate servers based on a determined popularity level of the requested content. An example of SRv6 implementation is provided in FIG. 3.

Figure 2:
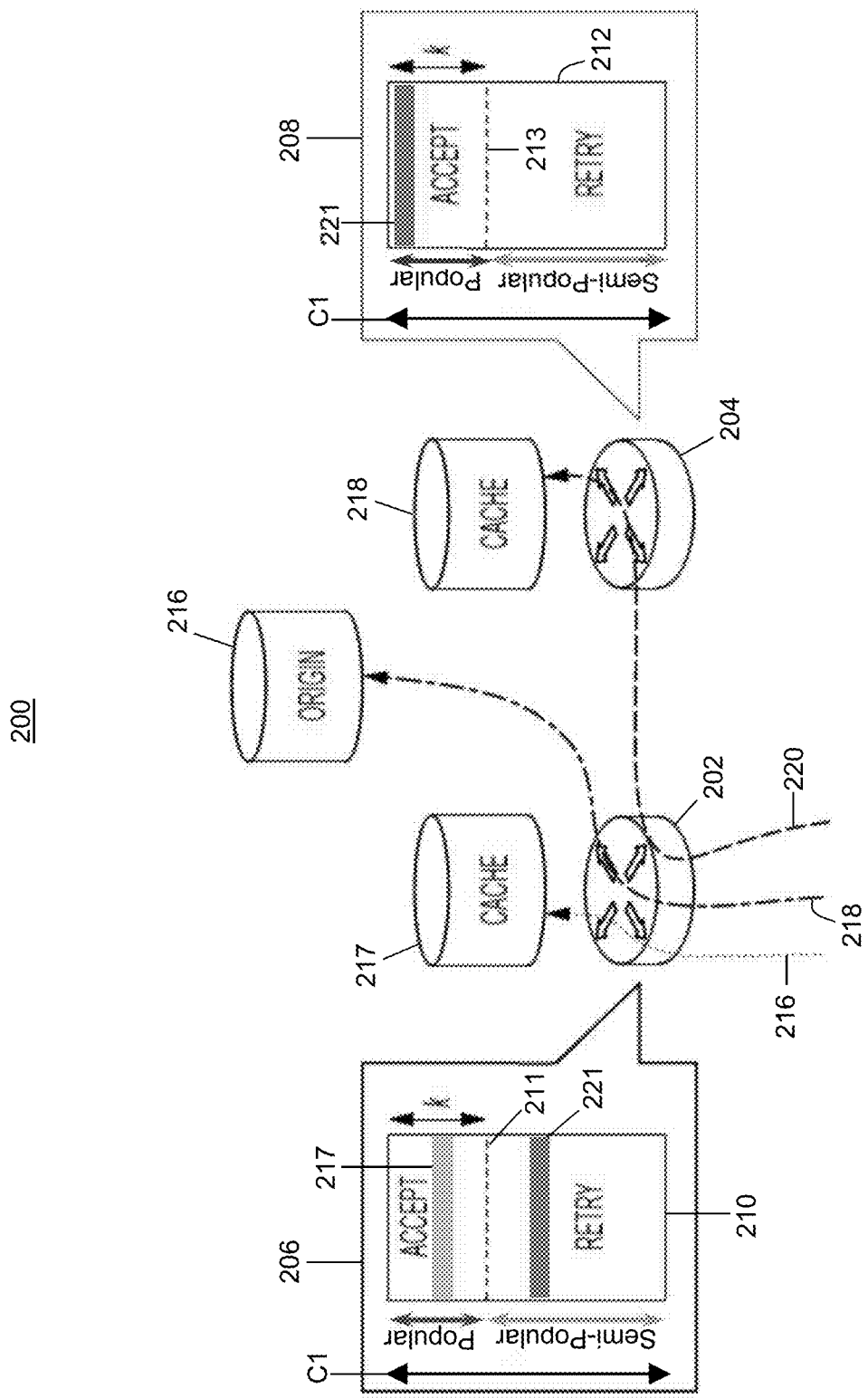
FIG. 2 illustrate a content delivery system with improved cache server hit rate, in accordance to some embodiments of the present technology.

FIG. 2 illustrates an operation of an example content delivery network (CDN) 200, in accordance with some embodiments of the present technology. In the example CDN network 200 content routers 202 and 204 comprise a Last Recently Used (LRU) filter components 206 and 208, respectively. The LRU filter 206 comprises a meta-cache 210 of size C1 with an associated (popularity) threshold parameter 211 and the LRU filters 208 comprises a meta-cache 212 of size C1 with an associated threshold parameter 213. LRU filters 206 and 208 control and filter access to the origin server 216 and the cache server cluster comprising of cache server 217 and 218. In some embodiments, LRU filter functionality may be incorporated into one or more content routers. In some embodiments, LRU filters may be implemented as independent devices, software services, protocols, or a combination software/hardware service. LRU filters may be disposed close to the network edge and tasked with controlling and filtering of content requests to and from one or more associated cache servers and/or one or more origin content servers. In some embodiments, LRU filter may be implemented as a unit that is communicatively coupled to one or more content routers and provides necessary information to the corresponding content routers as to how to route requests for different contents.

Referring back to FIG. 2, an operation of the example CDN 200, upon receipt of a content request, is illustrated in accordance with some embodiments, by flow lines 216, 218 and 220. Flow line 216 corresponds to a scenario wherein the content identifier (217) in the incoming request packet is found in the meta-cache 210 of the LRU filter 206, and its corresponding index value is smaller than the threshold index value (i.e., its position is above the threshold index 211 which corresponds to the popular portion of the meta-cache 210). Accordingly, LRU filter 206 moves the corresponding content identifier to the top of the meta-cache 210 and the query is accepted by the corresponding cache server (i.e., the query is served by the edge server 217.) In case of a cache miss at 217, the requested (popular) content is proxied from origin server 216 and a local copy is saved on the cache server 217.

When considering the index of an element in the LRU cache, the smaller the index, the earlier the element appears in the cache list. As a consequence the smaller the index, the greater the popularity. A content may therefore be deemed as popular whenever its index is smaller than the threshold, and semi-popular whenever its index is greater than the threshold in accordance to some embodiments of the present technology. However, It should be noted that with respect to the illustration of the LRU cache 210 and 212 in FIG. 2, the bottom of the LRU heap corresponding to the more recently observed contents is depicted on the top part of the LRU cache illustration. Therefore, example LRU cache illustrations 210 and 212 correspond to an ascending order of index value arrangement.

Conversely, flow line 218 corresponds to a scenario wherein the requested content identifier is not found in the meta-cache 210 of the LRU filter 206 (i.e., unpopular content). As such, LRU filter 206 adds/inserts the missing content Identifier at the top of meta-cache 210 (which causes the removal of the last content identifier in the meta-cache if it is full), and the query is refused (i.e. the request is directly forwarded to the origin server 216.)

As described, embodiments of the present technology provide for a mid-level rating of popularity (semi-popular) that is between unpopular and popular level. In the example CDN 200 of FIG. 2 this is illustrated by flow line 220 which corresponds to a scenario wherein the requested content identifier, embedded in layer 3 address portion of the incoming content request packet, corresponds to a content identifier (221), which is found in the meta-cache 210 of LRU 206, at a position with a greater index value than the threshold index 211 (i.e., its position is below the threshold index 211 which corresponds to the semi-popular portion of the meta-cache 210). For semi-popular content, a cache miss at the initial/first receiving cache server (cache server 217), will cause the LRU filter 206 or the content router 202 to re-route the request to a second pseudo-randomly-selected cache server (218) through its associated content router 204 (for example by using a Segment Routing Load Balancing forwarding protocol). Upon receipt of the re-directed content request, LRU filter 208 moves the corresponding content identifier (221) to the top of the meta-cache 212. If the second LRU filter (208) serving the second pseudo-randomly chosen cache server (218) also does not have the requested content (corresponding to content identifier 221), or if the second LRU filter (208) serving the second pseudo-randomly chosen cache server (218) does have the requested content but at a position above the threshold parameter 213 (i.e., in the semi-popular portion of the meta-cache 212, the query is forwarded to the Origin server 216. If the re-directed content is deemed as popular according to the LRU filter 212 of the second edge cache server 218, the request is accepted locally on the second edge cache server 218 and, if locally unavailable, the content is proxied from the origin server 216.

In some embodiments, the aforementioned cache system may be implemented as a doubly linked list joined to a hash map of pointers to entries within the list. In one embodiment of the present technology, a size of the meta-cache is set to six times the size of the cache to which it filters access. This provides almost-optimal hit-rate in the case of a light load (where threshold is thus equal to size)

Some embodiments of the present technology is directed to a filtering scheme for semi-popular content that involves re-directing a cache miss from a first receiving cache server to another cache server. This feature is based on the likelihood that a semi-popular content will be available at another edge cache, and thus incurring the forwarding latency of triangular routing between two caches to visit another cache before going back to the origin (which is typically geographically farther away) is deemed as worthwhile. To that purpose, in accordance to some embodiments, IPv6 Segment Routing (SRv6) and Segment Routing Load Balancing (SRLB) protocol(s) may be leveraged to visit multiple pseudo-randomly-chosen caches before re-directing the request back to the origin server.

Figure 3:
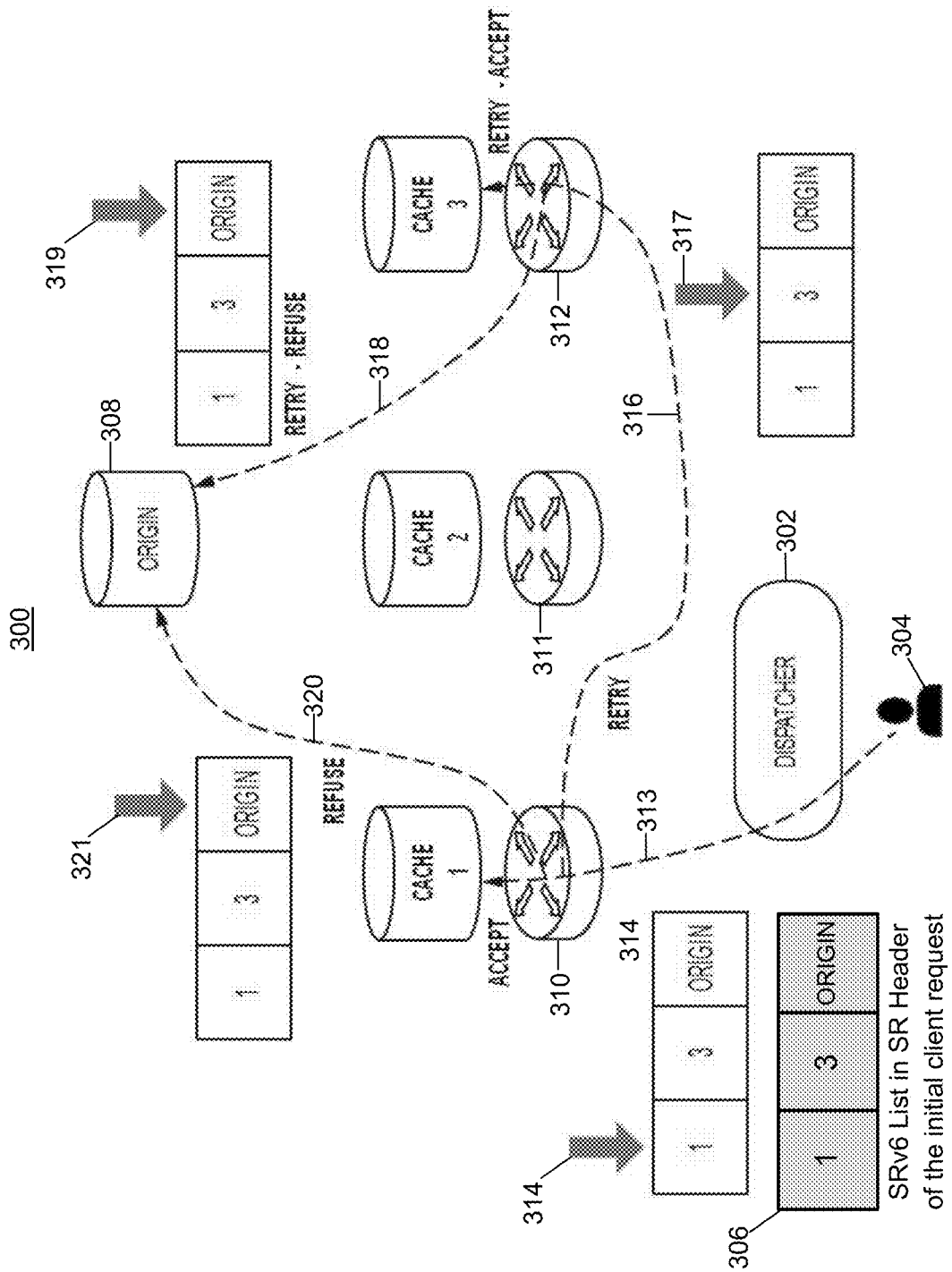
FIG. 3 illustrate a content delivery system with improved cache server hit rate, in accordance to some embodiments of the present technology.

FIG. 3 illustrates an example of Segment Routing implementation 300 for a popularity-based filtering of content request and response traffic in accordance to some embodiments of the present technology. In the example implementation 300, a dispatcher unit (302), which may be located near the client 304 (e.g. in the clients network stack, or set-top box) is deployed to inserts a Segment Routing header (comprising a Segment Identifier List 306) into a content request packet to facilitated a request filtering process upstream. For example, when the client 304 issues a new-connection packet (e.g. TCP SYN), the dispatcher 302 inserts a Segment Identifier (SID) list 306 into Segment Routing Header of a request packet. In the example embodiment illustrated in FIG. 3, SID list 306 comprises three entries, with the first two entries corresponding to segment identifiers 1 and 3, respectively identifying two pseudo-randomly-chosen cache servers cache server 1 and cache server 3. The last entry in SID list 306 corresponds to a segment identifier for the origin server 308. For the purpose of clarification, when Segment Routing is implemented with an IPv6 forwarding plane, an SID list may be interchangeably referred to as an SRv6 (Segment Routing with IPv6 forwarding) list.

The accepting server (which may be any of the cache or origin server), upon acceptance of the new-connection packet from the client 304, inserts its network or segment address as metadata into the response packet back to the client. The dispatcher (302) then records the address of the responding server for the remainder of the lifetime of the connection. Accordingly, when the client issues a further packet (e.g. TCP ACK) to the accepting server, the dispatcher inserts a Segment Routing header with only one segment identifier, that identifies the accepting server from the original trio of servers identified in the SID list 306 (namely, cache server 1, cache server 3 and origin server.)

Therefore once a response containing metadata with the address of the accepting server is received by the dispatcher, all subsequent packets associated with the established connection (to the accepting server) will only include the one segment identifier (from the three specified in the original Segment Identifier list embedded in the initial content request or new-connection packet) corresponding to the server/node which accepted the content request and terminated the connection. Consequently, the client is able to establish a direct data connection to the accepting server for the delivery of the requested content.

With reference to the example in FIG. 3, LRU filter/content router 310, 311 and 312 are deployed for the purpose of filtering access to and managing a cache-miss response of cache servers 1, 2 and 3, respectively. As such each LRU filter/content router is disposed in proximity to the cache server to which it filters access. In accordance to the example embodiments in FIGS. 2 and 3 the filtering/managing operation of the LRU filter/content router depends upon a threshold-based popularity classification of the requested content as popular, semi-popular or unpopular.

Referring back to FIG. 3, the incoming (new-connection) content request 313 destined for cache server 1 is received at the corresponding LRU filter/content router 310. If the requested content identifier (extracted from the content request 313) is found in the popular portion of the meta-cache in the LRU filter/content router 310, the requested content is deemed as 'popular'. Accordingly, the content request is accepted at cache server 1 (the initial receiving cache) and the corresponding connection 313 is terminated there at. As such, the request packet is forwarded to the local stack of cache server 1 without visiting further segments. If the requested 'popular' content is not locally available on cache server 1, the request is proxied to the origin server 308 and the content is inserted into the cache server 1 according to the insertion policy of the caching software (i.e., Least Recently Used, Least Frequently Used, Fist In Fist Out, etc.). After terminating connection 313. Cache server 1 will dispatch a response packet back to the client with its segment identifier (1), indicated by reference 314 in FIG. 3.

However, if the requested content identifier (extracted from the content request packet) is found in the semi-popular portion of the meta-cache (items 210 and 212 in FIG. 2) in the LRU filter/router 310, the requested content is deemed as 'semi-popular'. Accordingly, LRU filter/router 310 triggers a retry, corresponding to connection 316 in FIG. 3 (connection 220 in FIG. 2) and forwards the request to the next segment identifier entry (i.e., SID 3) in the SRv6 list 306 which corresponds to the second pseudo-randomly selected cache server (cache server 3). This will require the LRU filter/router 310 (associated with cache server 1) to route/forward the content request to a corresponding LRU filter/router 312 associated with cache server 3. If the requested "semi-popular" content is is deemed popular by the LRU filter 312, the re-tried/re-directed content request is accepted at cache server 3 (the second receiving cache) and the corresponding connection 316 is terminated there. As such, the request packet is forwarded to the local stack of cache server 3 without visiting further segments and the requested 'semi-popular' content is served directly at cache server 3. After terminating the connection 316, the accepting server (cache server 3) will dispatch a response packet back to the client into which it inserts its own segment identifier (3), indicated by reference 317 in FIG. 3. However, if the requested 'semi-popular' content is not found nor deemed popular by the LRU filter 312 serving cache server 3, the connection request 316 is refused and the request is re-directed, across connection 318, to the origin server 308 (the last segment specified in the SRv6 list 306). The origin server 308 will accept the request and terminate the corresponding connection 318. As such, the request packet is forwarded to the local stack of origin server 308 and the requested 'semi-popular' content is served directly at origin server 308. After terminating the connection 318, the Accepting server (origin server 308) will dispatch a response packet back to the client into which it inserts its own segment identifier (ORIGIN), indicated by reference 319 in FIG. 3.

Finally, if the requested content identifier, extracted from the client request packet destined towards the initial receiving cache (cache server 1), is not found anywhere in the meta-cache (illustrated as items 210 and 212 in FIG. 2) of the corresponding LRU filter/router 310, the requested content is deemed as 'unpopular'. Accordingly, if the requested 'unpopular' content is not locally available on cache server 1, the missing content identifier is inserted at the top of the meta-cache associated with LRU filter/router 310, and the request is re-directed, across connection 320, to the Origin server 308. Queries directed to the origin server 308 are terminated and forwarded to the local stack. After terminating the connection 320, the accepting server (origin server 308) will dispatch a response packet back to the client into which it inserts its own segment identifier (ORIGIN), indicated by reference 321 in FIG. 3.

Hence, with high probability, unpopular content are not served by the edge cache but rather directly offloaded (at the network layer) to the origin server. The offloaded connections no longer need to be proxied at the edge, thus avoiding unnecessary HTTP terminations and the cache of the edge proxy is not be polluted with unpopular content, consequently increasing the hit rate.

In accordance to some embodiments of the present technology, a Proportional Integral (PI) controller may be used to tune the parameters of the LRU filter. For example, a PI controller may be used to tune the (popularity) threshold parameter which partitions a meta-cache of last recently requested content identifiers into popular and semi-popular portions, in such a way to control and optimize a trade-off between cache hit rate performance and average response time of network cache servers. For example, raising the popularity threshold in the meta-cache of an LRU filter, brings about an increase in the number of requests accepted at the corresponding cache server, hence a corresponding increase in the response time of the cache server. In some embodiments, a PI controller may be used in conjunction with the LRU filter in order to tune a popularity threshold parameter (for identification of popular content) of the LRU filter. A PI-controller accomplishes this by, for example, taking the current response time of the associated cache server (to which the LRU filters access), as an input parameter, and comparing it with an objective flow completion time, to make according adjustments to a value of the (popularity) threshold parameter of the LRU filter, until a desired balance is reached. In this way, PI controller may be used to optimize network cache access.

Figure 4:
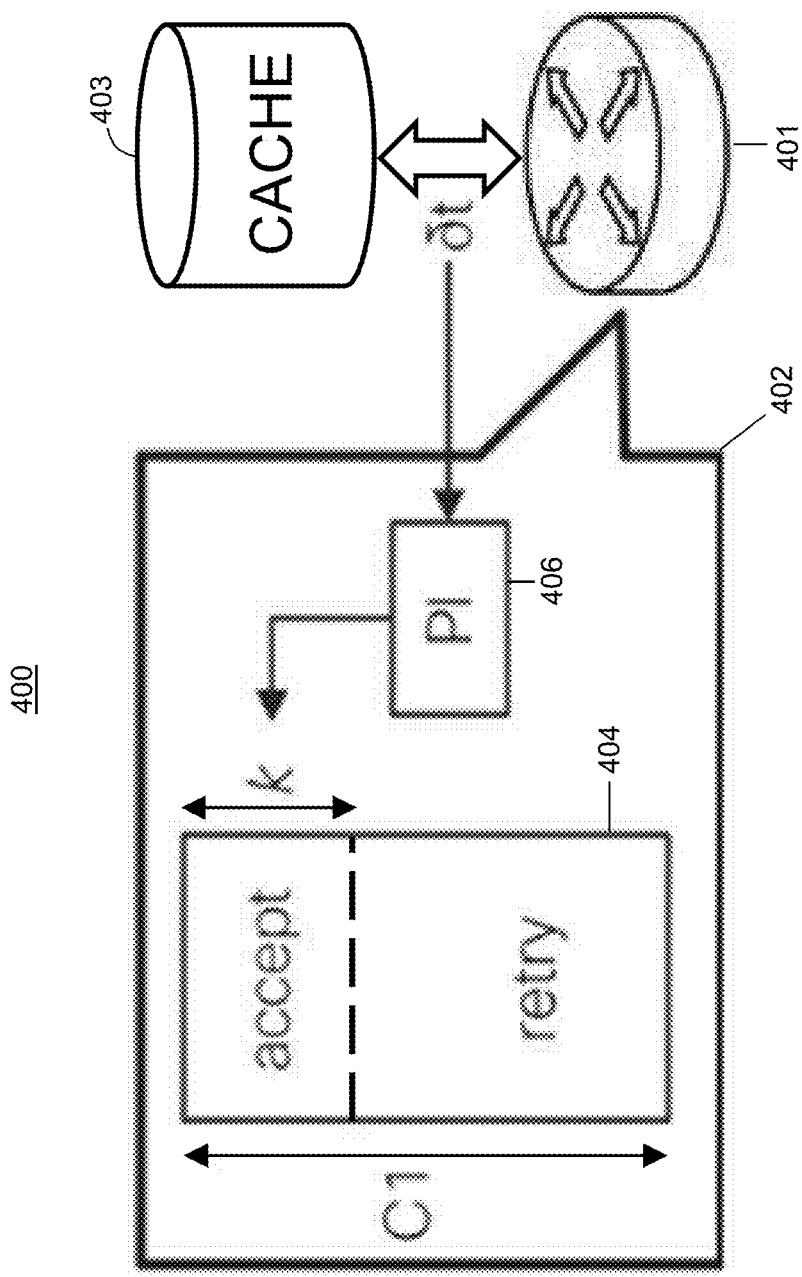
FIG. 4 illustrates a PI-controller used for optimizing a popularity-based filtering of content requests in a content delivery network, in accordance to some embodiments of the present technology.

FIG. 4 illustrates an example implementation 400 wherein a content router 401 working in conjunction with an LRU filter 402 is used to filter and control access to a cache server 403. The LRU filter 402 further comprises a meta-cache 404 of size C1 for storing content identifiers and a threshold parameter k associated with identification of popular/semi-popular/unpopular content. The popular/semi-popular/unpopular classification of content requests ultimately determines which content requests are accepted at the cache server, which are retried with a different cache server, and which are refused and re-directed to the origin server. In the example implementation 400, a response time, 'δt', of a cache server 403, may be measured and provided as input to a PI controller 406. The PI-controller 406, based on the input response time, optimally tunes the level of the threshold parameter k in the meta-cache 404 of LRU filter 402. In this way a PI-controller may be used to tune and optimize operation of an LRU filter which ultimately improves edge caching performance in networks.

In one embodiment of the invention, a PI-controller may be implemented using a self-tuning PI such as Yaksha that controls a web server response time by filtering requests according to an acceptance probability. One advantage of such self-tuning PI-controller is that it may act as an independent module in front of the cache without requiring any integration effort. Furthermore, the self-tuning functionality obviates requirements for human input or prior-knowledge of the server Characteristics.

According to some embodiment, Yaksha-based filtering may be adapted for operation as prescribed by some embodiments of the present technology, by converting the filtering criteria from an acceptance probability into a Last Recently Used (LRU) popularity threshold.

If the request pattern follows a Poisson arrival and the popularity distribution q(r) is known, in accordance to some embodiments, Che's approximation may be utilized to compute the probability of accepting a request for a content as a function of the content popularity threshold. Content popularity threshold, may be defined by equation (1.1), wherein k represent the content popularity threshold and p(k), as defined by equation 1.2, represents the probability of accepting a request as a function of the content popularity threshold, k. The parameter $t_c$ in equation 1.1 and 1.2 corresponds to the root of the equation 1.1.

$$\sum_r (1 - e^{-t_c q(r)}) = k \quad (1.1)$$

$$p(k) = \sum_r q(r)(1 - e^{-t_c q(r)}) \quad (1.2)$$

Figure 5:
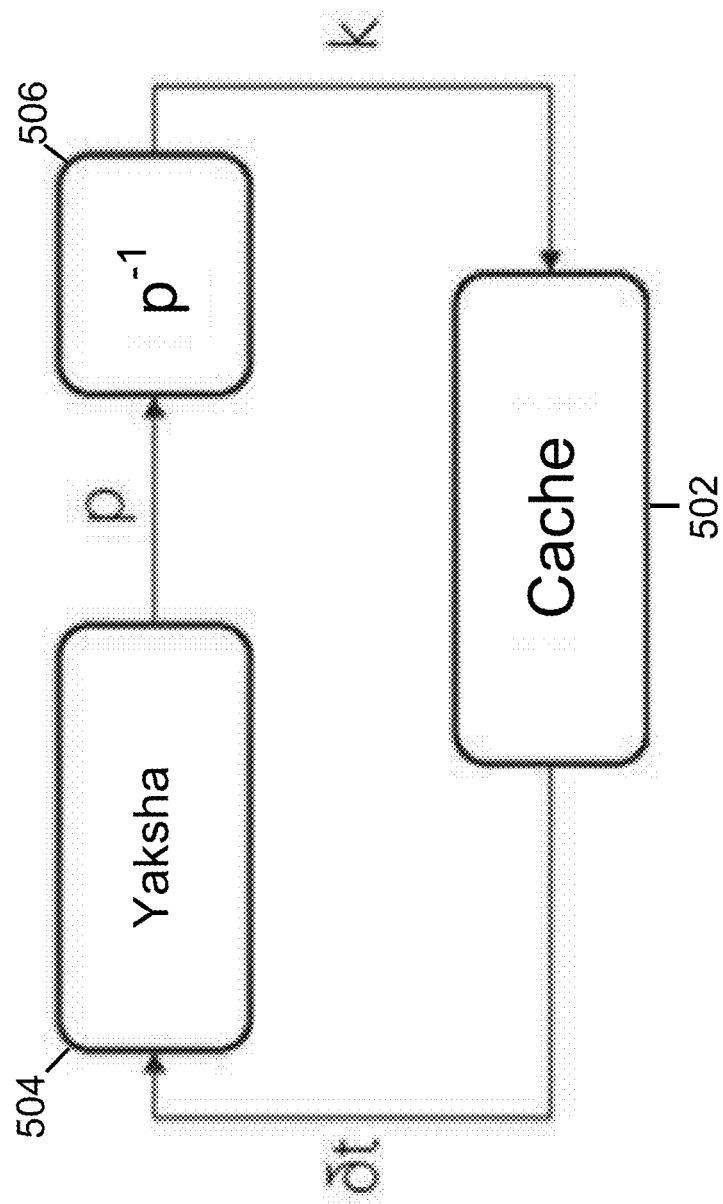
FIG. 5 illustrates a flow diagram for computing a popularity-based filtering criteria as a function of acceptance probability output of a Yaksha derived controller, in accordance to some embodiments of the present technology.

The probability function defined by (1.2) may then be inverted in order to compute k as a function of the acceptance probability output by a Yaksha filter (i.e., a self-tuning PI, configured to filter server requests in accordance to an acceptance probability.) This is illustrated in FIG. 5 wherein a response time 'δt' of a cache server 502 is used as input into a Yaksha filter 504. The output 506 of the Yaksha filter, corresponding to acceptance probability p, is inverted at 506, to thus, compute a content popularity threshold parameter k as a function of p. The threshold parameter k may then be used to provide a multi-tiered popularity rating for the requested contents. In some embodiments, the inversion operation (506) may be performed through a pre-computed inversion tables for efficiency purpose.

It should be noted that embodiments of the disclosed technology provide for any self-tuning PI-controller to be used directly on the popularity threshold parameter k. In some embodiments, the tuning may be performed on server-side metrics, such as CPU usage or TCP queue length instead of the flow completion time. Such metrics may be more precise and instantaneous than flow completion time but may require tighter coupling of the acceptance system and the cache server.

Figure 6:
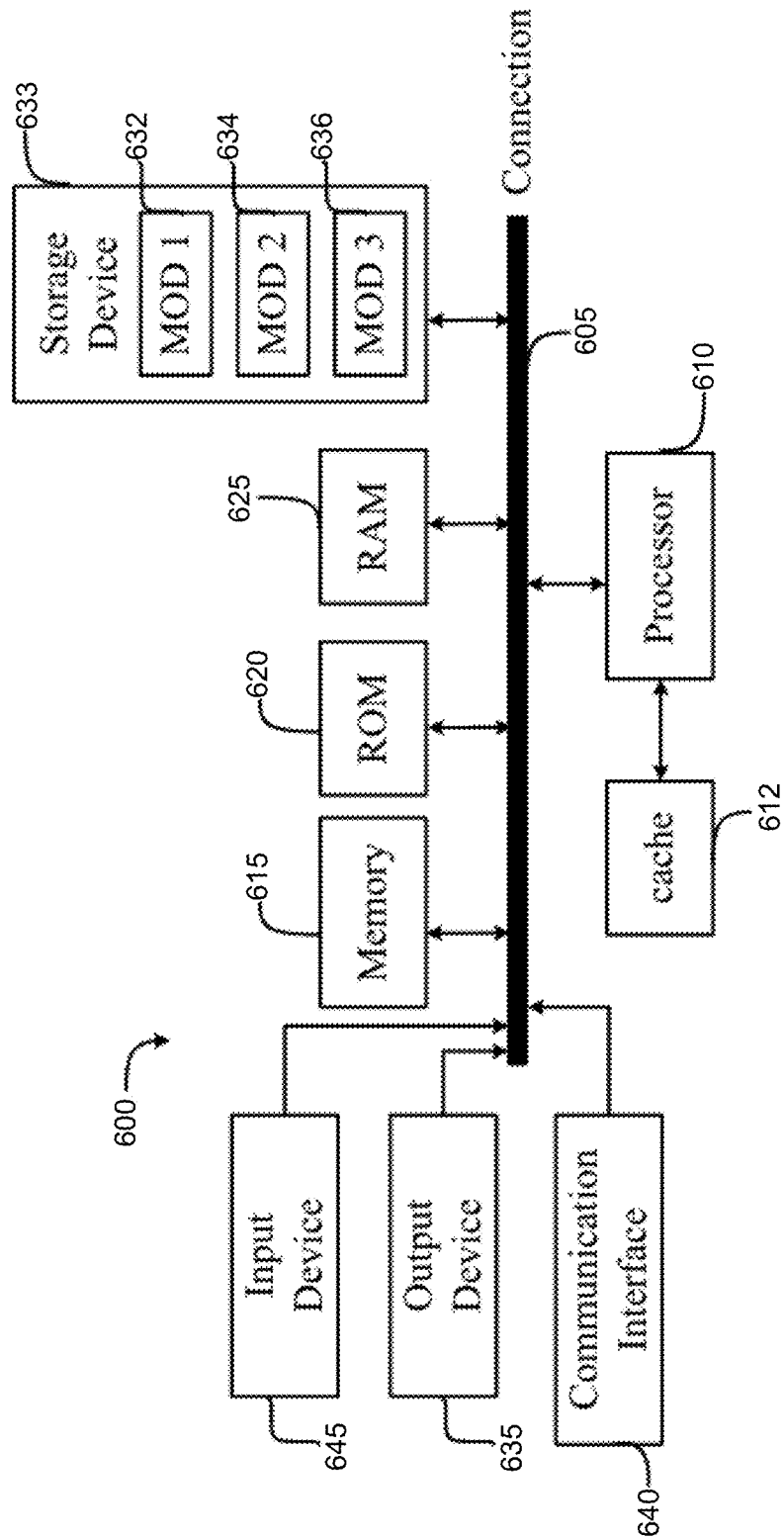
FIG. 6 illustrates an example network device in accordance to some embodiments of the present technology.
Figure 7:
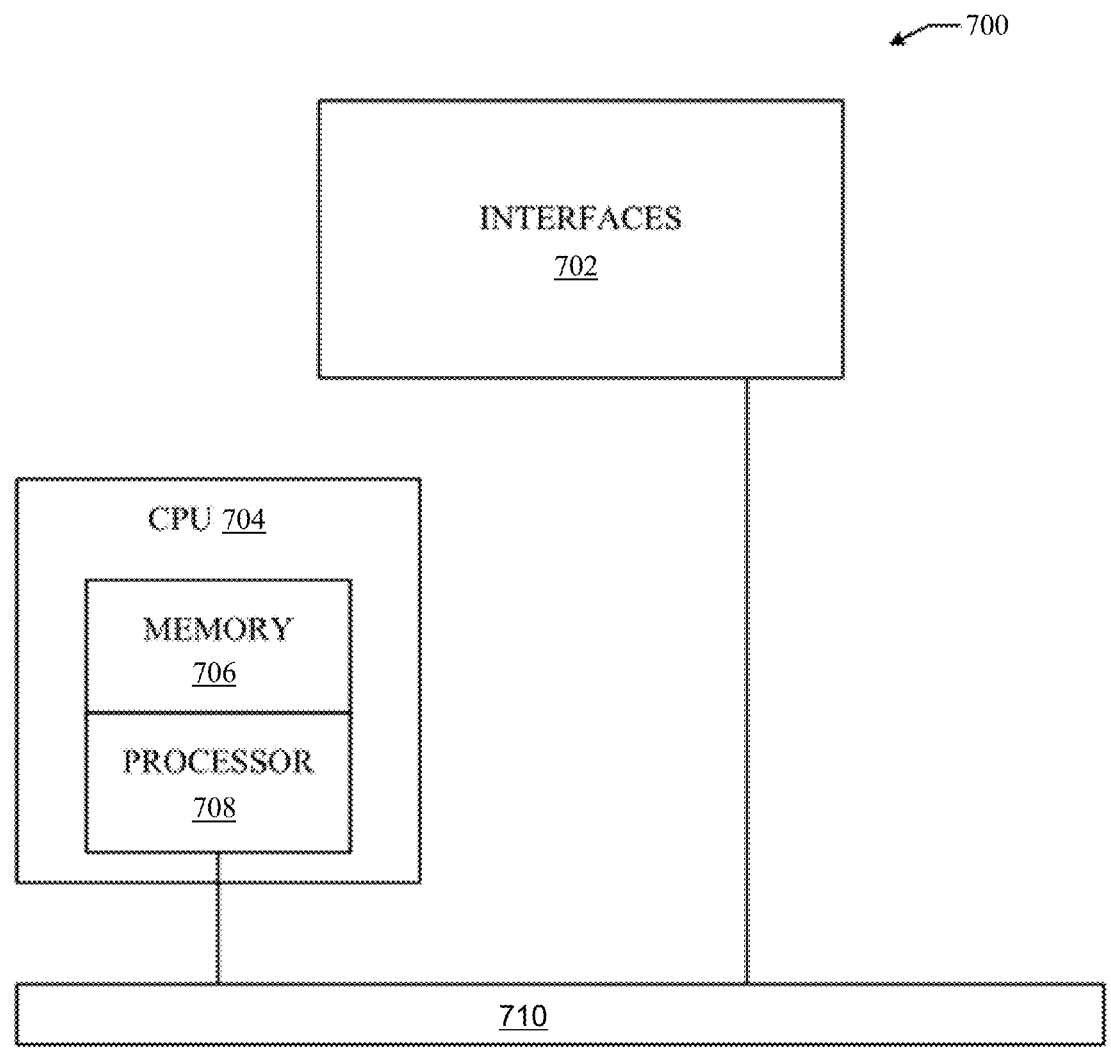
FIG. 7 illustrates an example architecture of a computing device, in accordance to some embodiments of the present technology.

The disclosure now turns to FIGS. 6 and 7, which illustrate example architectures of computing an network devices, such as client computers, switches, routers, controllers, servers, and so forth FIG. 6 illustrates a computing system architecture 600 including components in electrical communication with each other using a connection 605, such as a bus. System 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, assurance, and other networking operations. Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X106 family of microprocessors. In some cases, processor 708 can be specially designed hardware for controlling the operations of network device 700. In some cases, a memory 706 (e.g., non-volatile RAM, ROM, TCAM, etc.) also forms part of CPU 704. However, there are many different ways in which memory could be coupled to the system. In some cases, the network device 700 can include a memory and/or storage hardware, such as TCAM, separate from CPU 704. Such memory and/or storage hardware can be coupled with the network device 700 and its components via, for example, connection 710.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing, switching, and/or other operations. The ASIC can communicate with other components in the network device 700 via the connection 710, to exchange data and signals and coordinate various types of operations by the network device 700, such as routing, switching, and/or data storage operations, for example.

Figure 8:
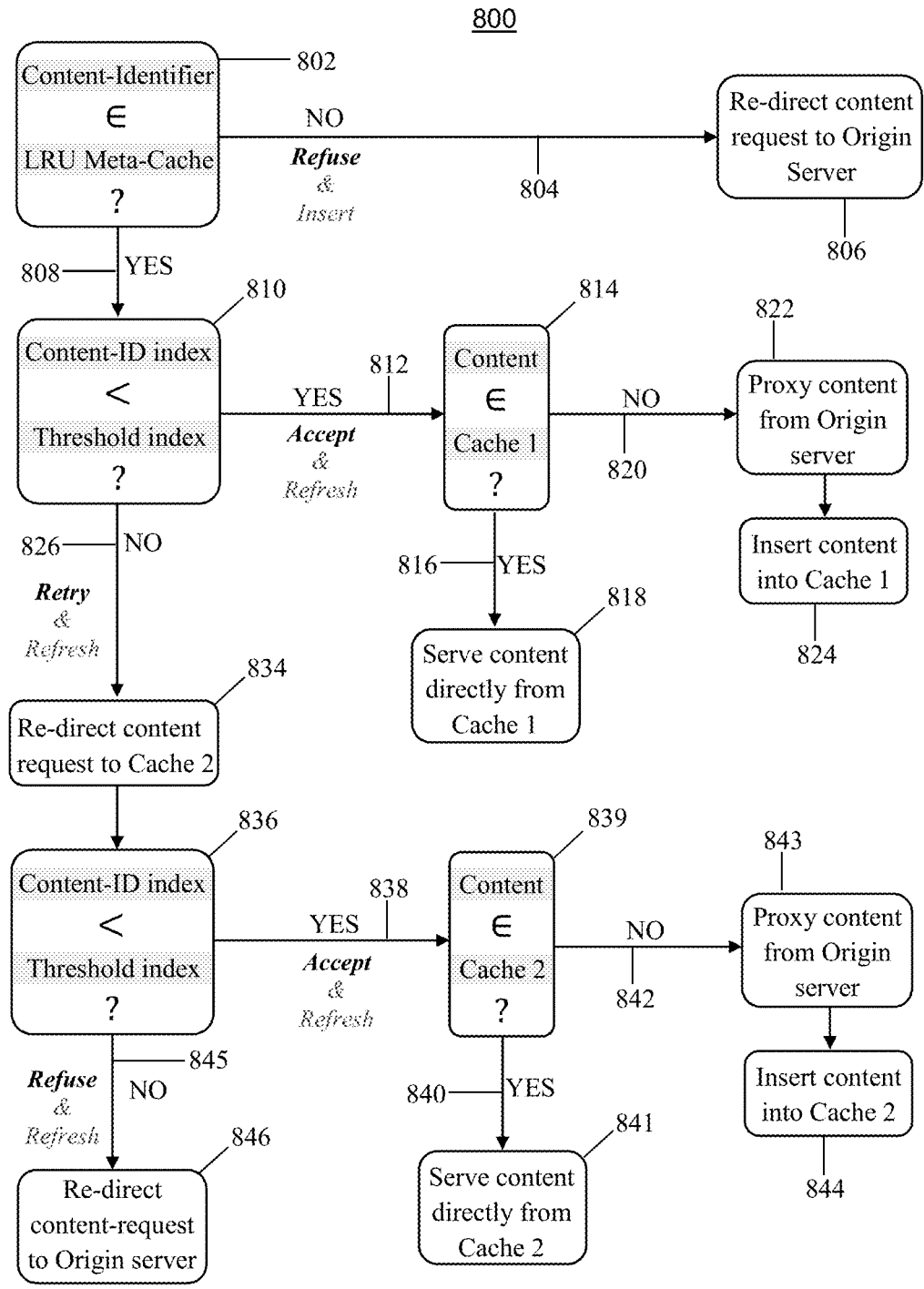
FIG. 8 illustrates a flowchart for an example content-request filtering process, in accordance to some embodiments of the present technology.

FIG. 8 illustrates an example process flow 800 for a popularity-based content-request filtering process based on applying a popularity threshold parameter to a meta-cache of last recently used content-identifiers. Popularity of a requested content chunk is determined based on a comparison of an index position of the corresponding content-identifier with a threshold index within the meta-cache of the last recently used content-identifiers. For example content-identifiers disposed in the meta-cache at index positions above the threshold index may be deemed as more popular whereas those disposed at indexed positions below the threshold index may be deemed as less popular (semi-popular). Content with no corresponding content-identifier within the meta-cache may be deemed as unpopular. The popularity determination may then determine how an LRU filtering/routing service will forward the content-request. With reference to FIG. 8 at step 802 a content-identifier embedded in an incoming content-request packet is examined with respect to the entries in a meta-cache of last recently used content-identifiers. If the incoming content-identifier is not present in the meta-cache (804), the requested content is deemed as unpopular, the missing content-identifier is inserted at the top of the meta-cache and the request is re-directed to the origin server at step 806. However if the incoming content-identifier is present in the meta-cache (808), the operation moves to step 810 wherein an indexed position of the content-identifier in the meta-cache is compared to a threshold index value.

If the indexed position of the incoming content-identifier is higher (closer to the top) in the LRU meta-cache than the threshold index (812) the content is deemed as popular and the operation moves to step 814 wherein the associated cache server (Cache 1) is checked for the requested content. If the content is present in Cache 1 (816), it is served directly therefrom at step 818. If the content is not present in Cache 1 (820), the operation moves to step 822 wherein the requested content is proxied, by Cache 1, from the origin server. The content is then inserted into Cache 1 at step 824.

However, if the indexed position of the incoming content-identifier is lower (closer to the bottom) in the meta-cache than the threshold index (826), the corresponding content is deemed as 'semi-popular' and the operation moves to step 834 wherein the content-request is re-directed, for example by a first LRU filtering/routing service serving the first cache server (cache 1), to a second LRU filtering/routing service serving a secondary cache server (Cache 2).

In some embodiments, the forwarding and redirection operation may be implemented using an SRv6 based approach, wherein segment identifiers for each of the first and the second cache servers and the origin servers are inserted as an SID list into a header of the content-request packet from the client.

Referring back to the example process flow 800 in FIG. 8, the second receiving LRU filtering/routing service serving the secondary cache server (Cache 2), upon receiving the re-directed content-request from the first LRU filtering/routing service, verifies the presence of the incoming content-identifier in the local meta-cache. If the incoming content-identifier is present in the meta-cache, the operation moves to step 836 wherein an indexed position of the content-identifier in the meta-cache is compared to a threshold index value. If the indexed position of the incoming content-identifier is higher (closer to the top) in the LRU meta-cache than the threshold index (838) the content is deemed as popular and the operation moves to step 839 wherein the associated cache server (Cache 2) is checked for the requested content. If the content is present in Cache 2 (840), it is served directly therefrom at step 841. If the content is not present in Cache 2 (842), the operation moves to step 843 wherein the requested content is proxied, by Cache 2, from the origin server. The content is then inserted into Cache 2 at step 844.

However, if the indexed position of the incoming content-identifier is lower (closer to the bottom) in the LRU meta-cache than the threshold index (845), the corresponding content is deemed as 'semi-popular' and the operation moves to step 846 wherein the content-request is re-directed, for example by the second LRU filtering/routing service serving the secondary cache server (cache 2), to the Origin server (846).

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, at a first router including a first meta-cache, a content request containing a content-identifier for requested content;
redirecting the content request to an origin server, in response to determining that the content identifier is not present in the first meta-cache;
serving the requested content from a first content cache associated with the first meta-cache, in response to at least the content identifier is present in the first meta-cache at an index position above a first threshold index value;
redirecting the content request to a second router including a second meta-cache, in response to at least determining that the content identifier is present in the first meta-cache at an index position below the first threshold index value;
in response to receiving the redirected content request at the second router:
directly serving the requested content from a second content cache associated with the second meta-cache, in response to at least the indexed position of the content identifier in the second meta-cache being above a second threshold index value;
redirecting the content request to the origin server, in response to determining that the content identifier in the second meta-cache is below the second threshold index value.

2. The method of claim 1, further comprising:
proxy serving the requested content from the first cache on behalf of the origin server in response to the content identifier being at an index position above the first threshold index value and the requested content not present on the first content cache.

3. The method of claim 1, further comprising:
adding the requested content to the first cache in response to the content identifier being at an index position above the first threshold index value and the requested content not present on the first content cache.

4. The method of claim 1, further comprising:
in response to receiving the redirected content request at the second router:
proxy serving the requested content from the second content cache on behalf of the origin server in response to the content identifier being at an index position above the second threshold index value and the requested content not present on the second content cache.

5. The method of claim 1, further comprising:
in response to receiving the redirected content request at the second router:
adding the requested content to the second content cache in response to the requested content being at an index position above the second threshold index value and requested content not present on the second content cache.

6. The method of claim 1, further comprising:
inserting the content identifier at the top of the first meta-cache in response to determining that the content identifier is not present in the first meta-cache, and/or
inserting the content identifier at the top of the second meta-cache in response to determining that the content identifier is not present in the second meta-cache.

7. The method of claim 1, further comprising tuning a value of the first threshold index value using a Proportional- Integral (PI) controller, wherein the tuned value adjusts a tradeoff between a cache hit rate and one or more network performance metrics.

8. A non-transitory computer readable media storing instructions which when executed by a processor cause a system to perform operations comprising:
   receiving, at a first router including a first meta-cache, a content request containing a content-identifier for requested content;
   redirecting the content request to an origin server, in response to determining that the content identifier is not present in the first meta-cache;
   serving the requested content from a first content cache associated with the first meta-cache, in response to at least the content identifier is present in the first meta-cache at an index position above a first threshold index value;
   redirecting the content request to a second router including a second meta-cache, in response to at least determining that the content identifier is present in the first meta-cache at an index position below the first threshold index value;
   in response to receiving the redirected content request at the second router:
      directly serving the requested content from a second content cache associated with the second meta-cache, in response to at least the indexed position of the content identifier in the second meta-cache being above a second threshold index value;
      redirecting the content request to the origin server, in response to determining that the content identifier in the second meta-cache is below the second threshold index value.

9. The non-transitory computer readable media of claim 8, the operations further comprising:
   proxy serving the requested content from the first cache on behalf of the origin server in response to the content identifier being at an index position above the first threshold index value and the requested content not present on the first content cache.

10. The non-transitory computer readable media of claim 8, the operations further comprising:
    adding the requested content to the first cache in response to the content identifier being at an index position above the first threshold index value and the requested content not present on the first content cache.

11. The non-transitory computer readable media of claim 8, the operations further comprising:
    in response to receiving the redirected content request at the second router:
       proxy serving the requested content from the second content cache on behalf of the origin server in response to the content identifier being at an index position above the second threshold index value and the requested content not present on the second content cache.

12. The non-transitory computer readable media of claim 8, the operations further comprising:
    in response to receiving the redirected content request at the second router:
       adding the requested content to the second content cache in response to the requested content being at an index position above the second threshold index value and requested content not present on the second content cache.

13. The non-transitory computer readable media of claim 8, the operations further comprising:
    inserting the content identifier at the top of the first meta-cache in response to determining that the content identifier is not present in the first meta-cache, and/or inserting the content identifier at the top of the second meta-cache in response to determining that the content identifier is not present in the second meta-cache.

14. The non-transitory computer readable media of claim 8, the operations further comprising tuning a value of the first threshold index value using a Proportional-Integral (PI) controller, wherein the tuned value adjusts a tradeoff between a cache hit rate and one or more network performance metrics.

15. A system, comprising:
    a processor; and
    a memory storing instructions programmed to cooperate with the processor to cause the system to perform operations comprising:
       receiving, at a first router including a first meta-cache, a content request containing a content-identifier for requested content;
       redirecting the content request to an origin server, in response to determining that the content identifier is not present in the first meta-cache;
       serving the requested content from a first content cache associated with the first meta-cache, in response to at least the content identifier is present in the first meta-cache at an index position above a first threshold index value;
       redirecting the content request to a second router including a second meta-cache, in response to at least determining that the content identifier is present in the first meta-cache at an index position below the first threshold index value;
       in response to receiving the redirected content request at the second router:
          directly serving the requested content from a second content cache associated with the second meta-cache, in response to at least the indexed position of the content identifier in the second meta-cache being above a second threshold index value;
          redirecting the content request to the origin server, in response to determining that the content identifier in the second meta-cache is below the second threshold index value.

16. The system of claim 15, the operations further comprising:
    proxy serving the requested content from the first cache on behalf of the origin server in response to the content identifier being at an index position above the first threshold index value and the requested content not present on the first content cache.

17. The system of claim 15, the operations further comprising:
    adding the requested content to the first cache in response to the content identifier being at an index position above the first threshold index value and the requested content not present on the first content cache.

18. The system of claim 15, the operations further comprising:
    in response to receiving the redirected content request at the second router:
       proxy serving the requested content from the second content cache on behalf of the origin server in response to the content identifier being at an index position above the second threshold index value and the requested content not present on the second content cache.

19. The system of claim 15, the operations further comprising:
in response to receiving the redirected content request at the second router:
adding the requested content to the second content cache in response to the requested content being at an index position above the second threshold index value and requested content not present on the second content cache.

20. The system of claim 15, the operations further comprising:
inserting the content identifier at the top of the first meta-cache in response to determining that the content identifier is not present in the first meta-cache, and/or
inserting the content identifier at the top of the second meta-cache in response to determining that the content identifier is not present in the second meta-cache.

* * * * *